(12) United States Patent
Wang et al.

(10) Patent No.: US 10,536,825 B2
(45) Date of Patent: Jan. 14, 2020

(54) SYSTEM FOR VEHICLE-TO-VEHICLE IDENTIFICATION AND DETECTION

(71) Applicant: BaiJieTeng Technology Corporation, Nanjing (CN)

(72) Inventors: Bing Wang, Nanjing (CN); Guo-Hao Wang, Jimo (CN); Chung-Ping Lai, Hsinchu County (TW)

(73) Assignee: BAIJIE TENG TECHNOLOGY CORPORATION, Nanjing (CN)

( * ) Notice: Subject to any disclaimer, the term of this patent is extended or adjusted under 35 U.S.C. 154(b) by 0 days.

(21) Appl. No.: 16/265,947

(22) Filed: Feb. 1, 2019

(65) Prior Publication Data

US 2019/0349729 A1    Nov. 14, 2019

Related U.S. Application Data

(62) Division of application No. 15/973,950, filed on May 8, 2018, now Pat. No. 10,349,246.

(51) Int. Cl.
| | |
|---|---|
| *H04W 4/08* | (2009.01) |
| *H04L 29/08* | (2006.01) |
| *H04W 4/40* | (2018.01) |
| *H04W 4/80* | (2018.01) |
| *H04W 4/02* | (2018.01) |
| *H01Q 9/04* | (2006.01) |

(52) U.S. Cl.
CPC ............... *H04W 4/40* (2018.02); *H01Q 9/04* (2013.01); *H04W 4/023* (2013.01); *H04W 4/80* (2018.02)

(58) Field of Classification Search
CPC ......... H04W 4/40; H04W 4/80; H04W 4/023; H04W 4/08; H04W 4/04; H04W 72/00; H01Q 9/04; G08G 1/0967; H04L 29/08
See application file for complete search history.

(56) References Cited

U.S. PATENT DOCUMENTS

| | | | | |
|---|---|---|---|---|
| 5,844,987 | A * | 12/1998 | Matthews | B60R 25/102 340/901 |
| 6,720,920 | B2 * | 4/2004 | Breed | B60N 2/2863 342/386 |
| 8,458,315 | B2 * | 6/2013 | Miche | H04L 67/12 709/223 |

(Continued)

*Primary Examiner* — Pablo N Tran
(74) *Attorney, Agent, or Firm* — Chun-Ming Shih; LanWay IPR Services

(57) ABSTRACT

A method for vehicle-to-vehicle identification and detection and a system for the same are revealed. A plurality of radio frequency (RF) communication units with different communication directions is arranged at a vehicle body. Each RF communication unit sends identification information of the vehicle to nearby vehicles in response to communication requests from the nearby vehicles. The vehicle sends communication requests to the nearby vehicles in different communication directions by antennas of the RF communication units using time-sharing polling or simultaneous communication scheme. Thus RF communication between vehicles is achieved for identification and detection of the nearby vehicles. The precise and accurate positioning of the respective vehicle within the area is achieved to support vehicle active safety control or provide data required for autonomous driving for improving driving safety.

9 Claims, 5 Drawing Sheets

(56) References Cited

U.S. PATENT DOCUMENTS

| | | | | |
|---|---|---|---|---|
| 8,949,017 B2* | 2/2015 | Ando | ................ | G08G 1/09675 |
| | | | | 701/301 |
| 9,449,515 B2* | 9/2016 | Rubin | ...................... | G08G 9/02 |
| 9,609,595 B2* | 3/2017 | Yamashiro | ......... | H04W 52/0216 |
| 9,643,603 B2* | 5/2017 | Kawahara | ............. | B60W 30/16 |
| 9,754,486 B2* | 9/2017 | Altintas | ................. | H04W 4/90 |
| 9,820,113 B2* | 11/2017 | Klang | .................. | H04W 4/023 |
| 9,832,618 B2* | 11/2017 | Sakata | .................... | H04W 4/08 |
| 9,897,453 B2* | 2/2018 | Yamashiro | ............. | G01C 21/30 |
| 9,936,025 B2* | 4/2018 | Cai | ........................ | H04L 67/12 |
| 10,171,955 B2* | 1/2019 | Schultz | ............ | G08G 1/096716 |
| 10,234,867 B2* | 3/2019 | Kawabata | ........... | B60K 31/0058 |
| 10,259,456 B2* | 4/2019 | Park | ........................ | H04L 67/12 |
| 2007/0162550 A1* | 7/2007 | Rosenberg | .............. | H04L 51/04 |
| | | | | 709/206 |
| 2011/0173279 A1* | 7/2011 | Janke | .............. | G08G 1/096716 |
| | | | | 709/206 |
| 2012/0268295 A1* | 10/2012 | Yuse | ................... | G08G 1/0104 |
| | | | | 340/905 |
| 2013/0012253 A1* | 1/2013 | Yamamoto | ....... | G08G 1/096716 |
| | | | | 455/509 |
| 2015/0145695 A1* | 5/2015 | Hyde | ...................... | G08G 1/166 |
| | | | | 340/905 |
| 2017/0230385 A1* | 8/2017 | Ruvio | ..................... | B60R 25/30 |
| 2019/0149598 A1* | 5/2019 | Sawada | .............. | H04L 67/1008 |
| | | | | 701/2 |

* cited by examiner

SYSTEM FOR VEHICLE-TO-VEHICLE IDENTIFICATION AND DETECTION

CROSS REFERENCE TO RELATED APPLICATIONS

The present application is a divisional application of U.S. patent application Ser. No. 15/973,950, entitled "Method and system for vehicle-to-vehicle identification and detection" fled on 8 May 2018, which is incorporated herein by reference.

FIELD OF THE INVENTION

The present invention relates to a vehicle active safety technology, especially to a method for vehicle-to-vehicle identification and detection and a system for the same to prevent car accidents under active safety.

DESCRIPTION OF THE PRIOR ART

Safety is the most important priority not only for drivers but also for vehicle manufacturers. Traditional automobile safety technology can be classified into two segments, namely active safety technology and passive safety technology. The passive safety technology comes to play after the accidents to minimize the damages from the collision while the active safety technology prevents risk of accidents during driving by using electric sensors or detectors to help automatic control of the vehicle parts.

A plurality of active automotive safety systems technologies has been used in vehicles available on the market, including Anti-lock Breaking System (ABS), Traction Control System (TRC), Electronic Stability Control (ESC), Lane Departure Warning System (LDWS), Active Cruise Control (ACC), Autonomous Emergency Braking (AEB), etc. These systems provide active detection among vehicles by using laser, microwave radar and image recognition technology.

Besides safety issue, vehicle manufacturers are also dedicated to develop driverless cars or autonomous vehicles. Key factors involved in the driverless cars or autonomous vehicles include environment perception, navigation and positioning, path planning, decision-making and control, etc. Although the above active safety systems work with many of the mature detection technologies, the autonomous vehicles are stuck on the last mile, figuring out complicated relative positions and angles of vehicles, distances between vehicles, communications among vehicles, and automatic negotiation for continuing to move forward or for reducing speed to stop. The positioning of the vehicle is achieved mainly based on global positioning system (GPS). However, the civil GPS available now is accurate in the range of 5 M (meters) and this is unable to meet high accuracy requirement for driverless cars/or autonomous vehicles.

The present invention has arisen to mitigate and/or obviate the afore-described disadvantages.

SUMMARY OF THE INVENTION

Therefore it is a primary object of the present invention to provide a method for vehicle-to-vehicle identification and detection and a system for the same by which relative position of the respective vehicle within a certain area is provided accurately and precisely for supporting vehicle active safety control or providing data required for autonomous driving.

In order to achieve the above object, a method for vehicle-to-vehicle identification and detection according to the present invention includes the following steps. First a vehicle (the present vehicle) receives communication requests in the form of radio frequency (RF) signals from nearby vehicles in a plurality of communication directions symmetrical to the center of the present vehicle in the plane where the present vehicle is located. Then send identification information of the present vehicle in the form of RF signals to the nearby vehicles in the communication directions according to the communication requests received in response to the communication requests from the nearby vehicles. Next send communication requests in the form of RF signals to the nearby vehicles in the communication directions symmetrical to the center of the present vehicle in the plane where the present vehicle is located using time-sharing polling or simultaneous communication scheme, and then receive identification information in the form of RF signals from the nearby vehicles.

As the center, the present vehicle not only receives RF signals of the communication requests from the nearby vehicles in the different communication directions symmetrical to the center of the present vehicle in the plane where the present vehicle is located, but also transmits the communication requests one by one in the communication directions using time-sharing polling or simultaneous communication scheme.

The identification information at least consists of registration information of the present vehicle, direction information of the communication directions of the communication requests received by the present vehicle, and operating parameters of the present vehicle.

The method of the present invention further includes a step of analyzing the identification information in the form of RF signals from the nearby vehicles to calculate the distance between the present vehicle and the nearby vehicles.

The present method further includes a step of checking and finding out relative position of the nearby vehicle to the present vehicle according to communication direction of the identification information received or content of the identification information.

A vehicle-to-vehicle identification and detection system according to the present invention includes a plurality of radio frequency (RF) communication units, a single-pole multiple-throw (SPMT) switch, and a master communication module. The RF communication unit consists of a RF communication module and an antenna electrically connected to the RF communication module. The antenna of the respective RF communication unit is in charge of RF communication between vehicles in different communication directions symmetrical to the center of the vehicle in the plane where the vehicle is located. The communication direction of the antenna of the respective RF communication unit is different while each RF communication unit can be switched between an active mode and a passive mode. The RF communication unit in the passive mode receives the communication requests from the nearby vehicles in the preset communication directions by the electrically-connected antenna. After receiving the communication requests, the RF communication unit sends a piece of identification information to the nearby vehicles by the electrically-connected antenna in response to the communication requests from the nearby vehicles. As to the master communication module, it switches the plurality of RF communication units to the active mode one by one by the SPMT switch using time-sharing polling or simultaneous communication scheme. The master communication module is electrically connected to the antenna of the RF communication unit in the active mode to send communication requests along the communication direction of the electrically-connected antenna and receive identification information from the nearby vehicles by the antenna. The nearby vehicles transmit the identification information in response to the communication requests.

Preferably, the master communication module is a radio frequency identification (RFID) reader. The RF communication unit includes a RF communication module and an antenna while the RF communication module consists of a tag integrated circuit (IC) of a RFID tag and a single-pole double-throw (SPDT) switch. The identification information is stored in the tag IC. The tag IC is electrically connected to the antenna by the SPDT switch when the RF communication unit is in the passive mode. While the RF communication unit being in the active mode, the master communication module is electrically connected to the antenna by the SPDT switch and electrical connection between the tag IC and the antenna is cut off.

The identification information at least consists of registration information of the vehicle, direction information of the communication directions of the communication requests received by the vehicle, and operating parameters of the vehicle.

Polarization isolation between antennas of the two adjacent RF communication units is provided. For example, one antenna is horizontally polarized while the other antenna is vertically polarized when both the antennas are linearly polarized antennas. The two antennas can also be circularly polarized antennas formed by a right-hand circularly polarized antenna and a left-hand circularly polarized antenna.

The antenna of the respective RF communication unit can be a narrow-beam antenna.

The system for vehicle-to-vehicle identification and detection further includes an information processor which analyzes RF signals of the identification information received to calculate the distance between the vehicles.

The information processor determines relative position of the nearby vehicle to the vehicle according to the communication direction of an antenna of the identification information received or the content of the identification information.

The present method and system feature on that the mutual positions of the vehicles within the area are determined accurately and precisely. The present method and the system can also support vehicle active safety control and provide data required for the driverless car/or autonomous driving. There are various types of transport in major cities worldwide. The RF communication module of the present invention has advantages of cost effective, compact volume and easy installation. The RF communication module can be arranged at bicycles. The present system is obviously different from the conventional autonomous driving such as Lidar (light detection and ranging), easy to be disposed on various types of vehicles in the cities. Thus the present method and system have a decisive influence on the evolution of autonomous driving within a certain area.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 2-1 is a functional block diagram showing a radio frequency (RF) communication unit in a passive mode according to the present invention;

FIG. 2-2 is a functional block diagram showing a radio frequency (RF) communication unit in an active mode according to the present invention;

DETAILED DESCRIPTION OF THE PREFERRED EMBODIMENTS

A method for vehicle-to-vehicle identification and detection according to the present invention includes the following steps.

First receiving communication requests in the form of RF signals from nearby vehicles in a plurality of communication directions symmetrical to the center of a vehicle (the present vehicle) in the plane where the present vehicle is located;

sending identification information of the present vehicle in the form of RF signals to the nearby vehicles in the communication directions according to the communication requests received in response to the communication requests from the nearby vehicles while the identification information at least including registration information of the present vehicle, direction information of the communication direction of the communication requests received by the present vehicle, and operating parameters of the present vehicle;

sending communication requests in the form of RF signals to the nearby vehicles in the communication directions symmetrical to the center of the present vehicle in the plane where the present vehicle is located using time-sharing polling or simultaneous communication; and receiving identification information in the form of RF signals the nearby vehicles transmit in response to the communication requests of the present vehicle.

In a preferred embodiment, radio frequency (RF) signals of communication requests from nearby vehicles in different communication directions are received by the present vehicle. The communication directions are symmetrical to the center of the present vehicle and located in the plane where the present vehicle is located. As shown in figures, there are eight different communication directions. The present vehicle also sends communication requests in eight different communication directions one after another using time-sharing polling or simultaneous communication. Then the RF signals of the identification information from the nearby vehicles are analyzed to calculate the distance between the present vehicle and the respective nearby vehicle. Thus precise and accurate positioning of the respective vehicle within the area is achieved to support vehicle active safety control or provide data required for autonomous driving for improving driving safety.

Figure 1:
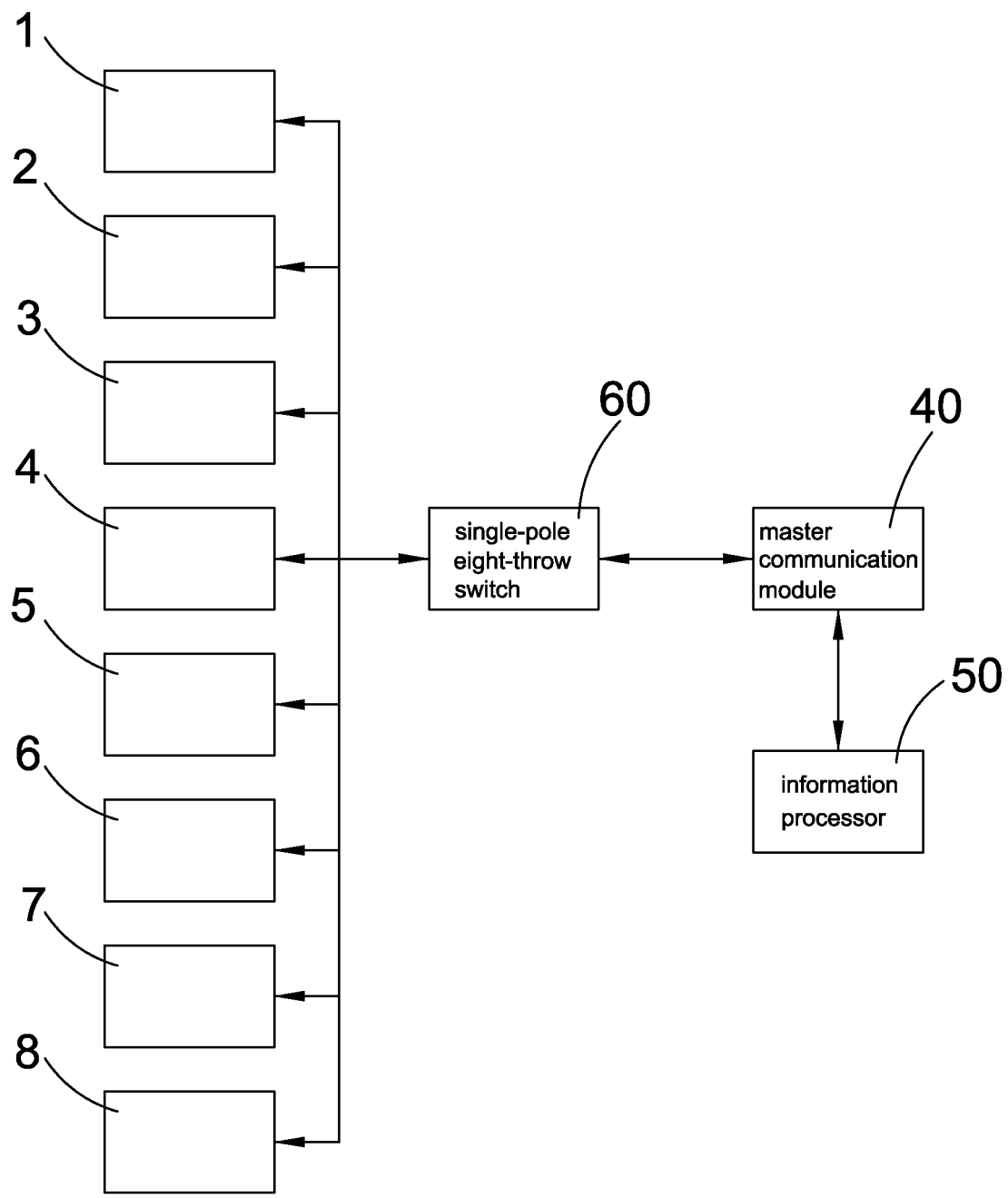
FIG. 1 is a functional block diagram showing structure of an embodiment of a vehicle-to-vehicle identification and detection system according to the present invention.
Figure 3:
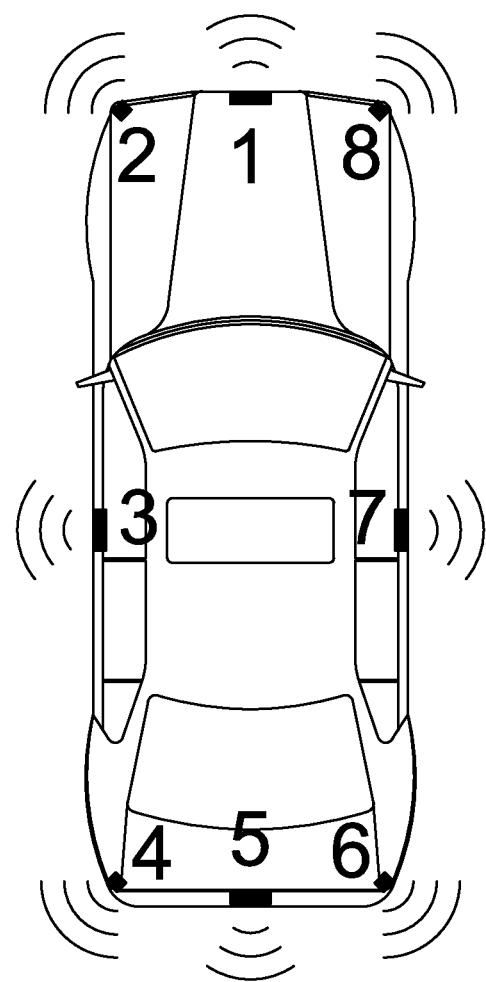
FIG. 3 is a top view of a vehicle showing a plurality of RF communication units disposed on a vehicle of an embodiment according to the present invention.

Refer to FIG. 1 and FIG. 3, there are eight RF communication units. For convenient description, the RF communication units are in charge of different communication directions respectively and represented by different numbers ranging from 1-8. For example, 1 represents the front center, 2 represents the left front, 3 represents the left side, 4 represents the left rear, 5 represents the rear center, 6 represents the right rear, 7 represents the right side, 8 represents the right front. The number of the RF communication units and that of the communication directions are not limited.

One master communication module 40 and eight RF communication units 1-8 are disposed on a vehicle body of the respective vehicle and each of the RF communication units 1-8 is responsible for different communication directions for RF communication between the present vehicle and nearby vehicles. The master communication module 40 is electrically connected to the eight RF communication units 1-8 so that each of the RF communication units 1-8 is switched between an active mode and a passive mode under control of the master communication module 40.

The RF communication units 1-8 in the passive mode receive the radio frequency (RF) signals of the communication requests from the nearby vehicles in the communication direction the respective communication unit is responsible for, and then send the identification information of the present vehicle (in the form of RF signals) to the nearby vehicles in response to the communication requests from the nearby vehicles. The RF communication units 1-8 switched to the active mode send communication request in the form of RF signals to the nearby vehicles in different communication directions they take charge of and then receive identification information (RF signals) that the nearby vehicles respond. In a preferred embodiment, the above signal transmission is achieved by Radio Frequency Identification (RFID) technology. The master communication module 40 is a RFID reader while the respective RF communication unit 1-8 is a RFID tag. Preferably, the RFID reader and the RFID tags use the same antenna for reducing cost of the hardware. The master communication module 40 transmits the above communication requests by the antenna shared with the RFID tags while the RFID tags in the passive mode are accessible to the RFID readers of the nearby vehicles. In other embodiment, the RFID reader 40 and tags can be replaced by other radio frequency communication technologies to achieve the operation between the active mode and the passive mode.

While using the time-sharing polling scheme, only one of the eight RF communication units 1-8 is switched to the active mode and the rest seven communication units 1-8 are in the passive mode. Under the simultaneous communication scheme, at least two of the RF communication units 1-8 are selectively switched to the active mode. In a preferred embodiment, the eight RF communication units 1-8 are in the passive mode under normal conditions while the master communication module 40 switches the eight RF communication units 1-8 to the active mode using time-sharing polling or simultaneous communication scheme and the switching continues constantly and repeatedly.

Figures 1, 2:
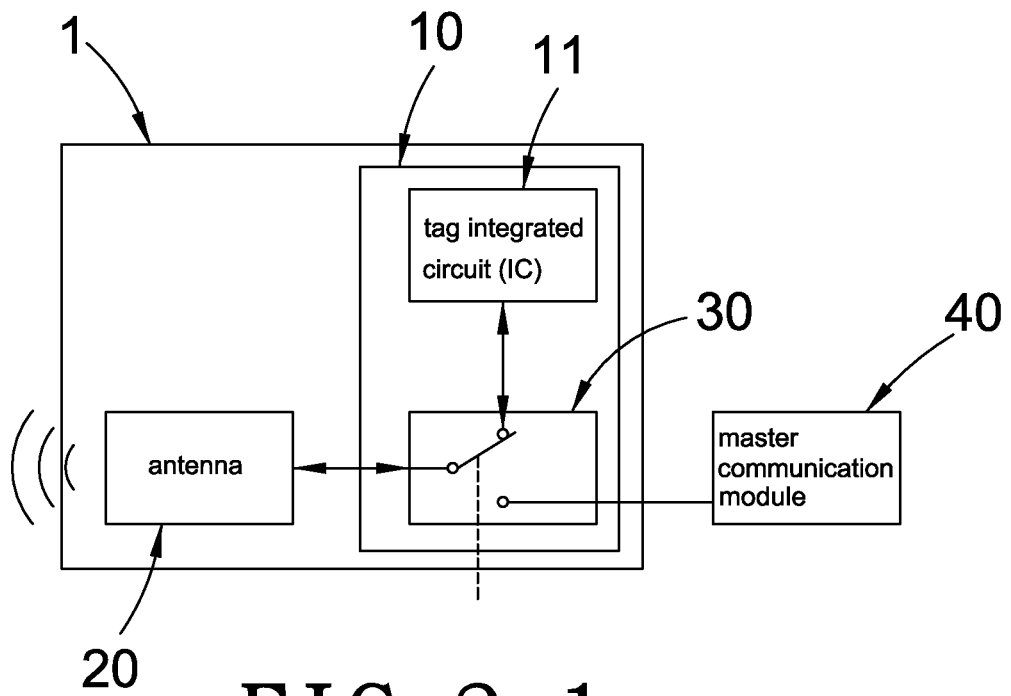
Figure 2:
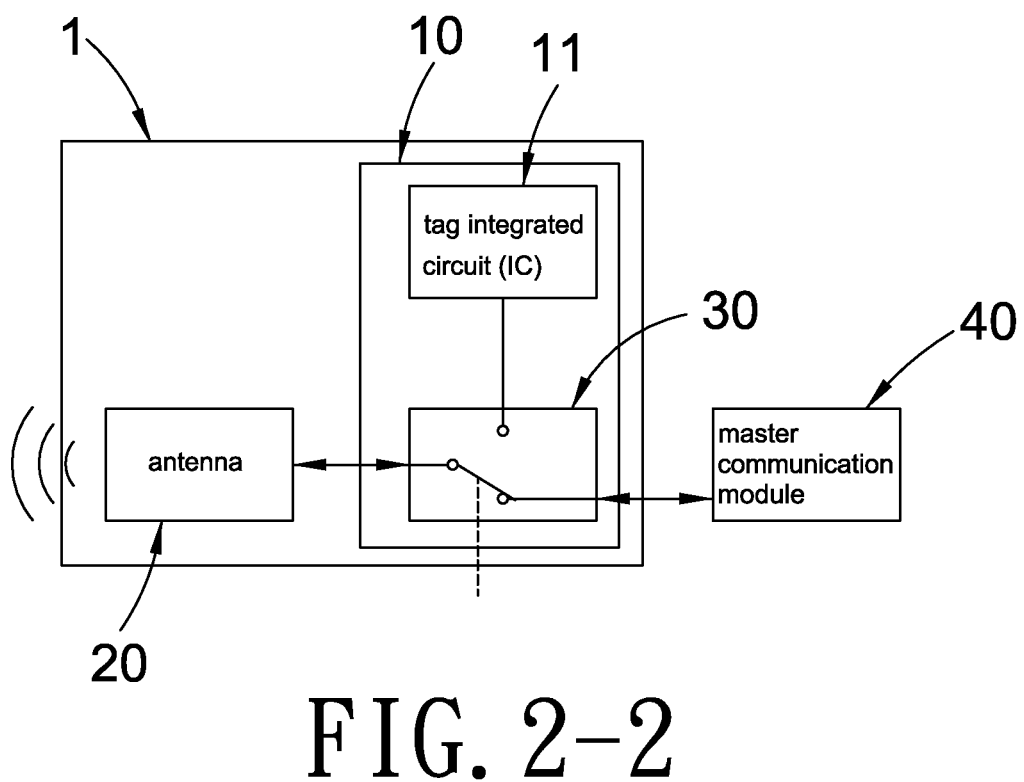

Refer to FIG. 2-1, the respective RF communication unit 1-8 includes a RF communication module 10 and an antenna 20. The RF communication module 10 consists of a tag integrated circuit (IC) 11 of a RFID tag and a single-pole double-throw (SPDT) switch 30. The tag IC 11 is electrically connected to the antenna 20 by the SPDT switch 30. The antennas 20 of the eight RF communication units 1-8 respectively are in charge of RF communication between the present vehicle and the nearby vehicles in different communication directions symmetrical to the center of the present vehicle in the plane where the present vehicle is located. Similarly, each of the nearby vehicles is also provided with the master communication module 40 and the eight RF communication units 1-8.

The identification information is recorded in a memory of the tag IC 11 of the respective RF communication unit 1-8 and at least including direction information of the communication directions the antennas 20 of the RF communication units 1-8 take charge of, registration information of the vehicle where the RF communication unit 1-8 are arranged, and operating parameters of the vehicle. For example, the antenna 20 of the RF communication unit 1 disposed on the front side of the vehicle body is responsible for the communication in the front center. Thus the direction information recorded in the memory of the tag IC 11 of the RF communication unit 1 is "1 the front center". The registration information can be vehicle model or vehicle registration numbers while the operating parameter can be vehicle speed.

Refer to FIG. 2-1, the RF communication module 10 is in the passive mode under normal conditions. The SPDT switch 30 is normally electrically connected to the tag IC 11 and the antenna 20. That mans each of the RF communication units 1-8 in the passive mode receives communication requests from the nearby vehicles in the preset communication direction by the electrically-connected antenna 20. After receiving the communication request, the RF communication unit 1a-8 sends a piece of identification information to the nearby vehicles in the preset communication direction of the electrically-connected antenna 20 in response to the communication request of the nearby vehicles for identification and detection purposes.

As shown in FIG. 1, a vehicle-to-vehicle identification and detection system according to the present invention includes eight RF communication units 1-8, a master communication module 40 and a single-pole multiple-throw (SPMT) switch (single-pole eight-throw switch 60 is used in this embodiment). During vehicle-to-vehicle identification and detection, at least one of the eight RF communication units 1-8 is switched to the active mode while the rest seven RF communication units 1-8 are in the passive mode. The master communication module 40 switches the eight RF communication units 1-8 to the active mode in turn by the single-pole eight-throw switch 60 using time-sharing polling or simultaneous communication scheme. At the moment, the master communication module 40 and the antenna 20 are electrically connected by the SPDT switch 30 (while the electrical connection between the tag IC 11 and the antenna 20 in the normal mode is cut off temporarily). The master communication module 40 transmits a communication request to the RF communication units 1-8 of the nearby vehicle by the electrically-connected antenna 20 so as to get identification information that the nearby vehicle responds. In other words, the master communication module 40 is only electrically connected to the antenna 20 of one of the RF communication units 1-8 in the active mode while the rest seven RF communication units 1-8 are still in the passive mode. The master communication module 40 is electrically connected to the antenna 20 of the respective RF communication unit 1-8 in turn by the single-pole eight-throw switch 60 using time-sharing polling or simultaneous communication scheme. Then the master communication module 40 transmits communication requests to the RF communication module 10 of the nearby vehicle by the electrically-connected antenna 20. The transmission of the communication requests (sending the communication requests) is defined as communication between the master communication module 40 of the present vehicle and the RF communication module 10 of the nearby vehicle through RF signals and is used for reading or identifying the identification information of the nearby vehicle in the memory of the RF communication module 10 of the nearby vehicle.

Polarization isolation between antennas 20 of the RF communication modules 10 of the two adjacent RF communication units 1-8 is provided. For example, one antenna 20 is horizontally polarized while the other antenna 20 is vertically polarized once both the antennas 20 are linearly polarized antennas. The two antennas 20 can also be circularly polarized antennas formed by a right-hand circularly polarized antenna and a left-hand circularly polarized antenna. As shown in FIG. 3, the linearly polarized antennas of the RF communication modules 10 arranged at the front center 1, the left side 3, the rear center 5 and the right side 7 respectively are placed horizontally (and represented by black rectangles) while the linearly polarized antennas of the RF communication modules 10 arranged at the left front 2, the left rear 4, the right rear 6, and the right front 8 respectively are placed vertically (and represented by black squares). The circularly polarized antennas 20 are also arranged similarly. The above arrangement of the antennas 20 is used to prevent the antenna 20 of the RF communication unit 1-8 in certain communication direction from reading the identification signals of the adjacent RF communication units 1-8 of the present vehicle after entering the active mode. Thereby misreading is avoided.

The antenna 20 can also be a narrow-beam antenna that is highly directional so that signals radiated by the antenna 20 of each of the RF communication units 1-8 is confined to the respective preset communication direction. The misreading can also be eliminated.

Figure 4:
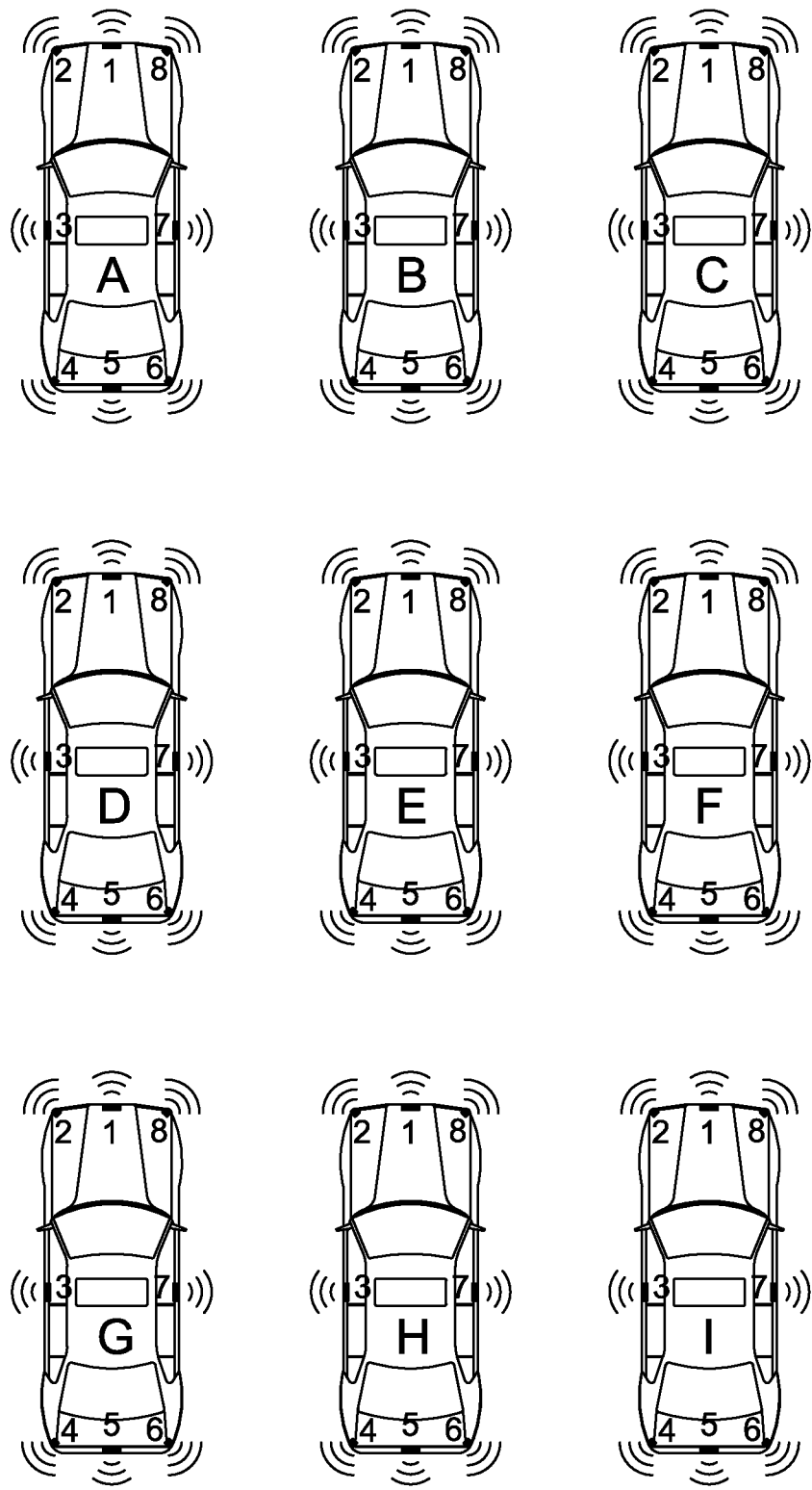
FIG. 4 is a schematic drawing showing RF communication between vehicles in different communication directions by means of RF communication units for identification and detection purposes of an embodiment according to the present invention.

Refer to FIG. 4, identification and detection among vehicles are carried out by the RF communication units 1-8 arranged at different directions.

In the FIG. 4, different vehicles are represented by different letters ranging from A to I labeled on top of each vehicle. The RF communication unit 1-8 of the vehicle is represented by combination of the letter of the vehicle and the number of the RF communication unit (ranging from 1-8). For example, the RF communication unit located in the front center of the vehicle A for RF communication is labeled as A1 while the RF communication unit disposed on the right side of the vehicle E for RF communication is numbered as E7. Take the vehicle E as an example to demonstrate the prevention of misreading mentioned above. The black rectangles in the FIG. 4 are the RF communication modules 10. The antenna 20 of the RF communication unit 1-8 in the black rectangles is the horizontally polarized antenna while the antenna 20 of the RF communication unit 1-8 in the black square is the vertically polarized antenna.

In order to learn interaction between the vehicle E and the nearby vehicles achieved by a plurality of RF communication units 1-8 worked in collaboration with the master communication module 40 for vehicle-to-vehicle identification and detection, please refer to the following chart 1.

The communication direction of the antenna 20 of the RF communication unit E1 of the vehicle E is the front center for detection of vehicles ahead. Once the RF communication unit E1 enters the active mode, the RF communication unit B5 can be identified effectively while the RF communication units A5 and C5 have a possibility of being identified.

The communication direction of the antenna 20 of the RF communication unit E2 of the vehicle E is the left front for detection of vehicles adjacent to the left front area of the vehicle E. The RF communication unit A6 can be identified effectively while the RF communication units B4 and D8 have a possibility of being identified when the RF communication unit E2 is in the active mode.

The communication direction of the antenna 20 of the RF communication unit E3 of the vehicle E is the left side for detection of vehicles on the left side. The RF communication unit D7 can be identified effectively once the RF communication unit E3 enters the active mode.

The communication direction of the antenna 20 of the RF communication unit E4 of the vehicle E is the left rear for detection of vehicles adjacent to the left rear area of the vehicle E. The RF communication unit G8 can be identified effectively while the RF communication units D6 and H2 have a possibility of being identified when the RF communication unit E4 is in the active mode.

The communication direction of the antenna 20 of the RF communication unit E5 of the vehicle E is the rear center for detection of vehicles behind. The RF communication unit H1 can be identified effectively while the RF communication units G1 and I1 have a possibility of being identified when the RF communication unit E5 is in the active mode.

The communication direction of the antenna 20 of the RF communication unit E6 of the vehicle E is the right rear for detection of vehicles adjacent to the right rear area of the vehicle E. The RF communication unit I2 can be identified effectively while the RF communication units F4 and H8 have a possibility of being identified when the RF communication unit E6 is in the active mode.

The communication direction of the antenna 20 of the RF communication unit E7 of the vehicle E is the right side for detection of vehicles on the right side. The RF communication unit F3 can be identified effectively once the RF communication unit E7 enters the active mode.

The communication direction of the antenna 20 of the RF communication unit E8 of the vehicle E is the right front for detection of vehicles close to the right front area of the vehicle E. The RF communication unit C4 can be identified effectively while the RF communication units B6 and F2 have a possibility of being identified when the RF communication unit E8 is in the active mode.

CHART 1

| number of RF communication unit | E1 | E2 | E3 | E4 | E5 | E6 | E7 | E8 |
|---|---|---|---|---|---|---|---|---|
| A4 | N | N | N | N | N | N | N | N |
| A5 | P | N | N | N | N | N | N | N |
| A6 | N | Y | N | N | N | N | N | N |
| B4 | N | P | N | N | N | N | N | N |
| B5 | Y | N | N | N | N | N | N | N |
| B6 | N | N | N | N | N | N | N | P |
| C4 | N | N | N | N | N | N | N | Y |
| C5 | P | N | N | N | N | N | N | N |
| C6 | N | N | N | N | N | N | N | N |
| D6 | N | N | N | P | N | N | N | N |
| D7 | N | N | Y | N | N | N | N | N |
| D8 | N | P | N | N | N | N | N | N |
| F2 | N | N | N | N | N | N | N | P |
| F3 | N | N | N | N | N | N | Y | N |
| F4 | N | N | N | N | N | P | N | N |
| G2 | N | N | N | N | N | N | N | N |
| G1 | N | N | N | N | P | N | N | N |
| G8 | N | N | N | Y | N | N | N | N |
| H2 | N | N | N | P | N | N | N | N |
| H1 | N | N | N | N | Y | N | N | N |

CHART 1-continued

| number of RF communication unit | E1 | E2 | E3 | E4 | E5 | E6 | E7 | E8 |
|---|---|---|---|---|---|---|---|---|
| H8 | N | N | N | N | N | P | N | N |
| I2 | N | N | N | N | N | Y | N | N |
| I1 | N | N | N | N | P | N | N | N |
| I8 | N | N | N | N | N | N | N | N |

N: unable to be identified
P: having a possibility of being identified
Y: able to be identified As shown in FIG. 4, a vehicle ahead is detected once the RF communication module 10 of the RF communication unit E1 of the vehicle E receives identification information in the RF communication module 10 of the RF communication unit B5 and gets direction information of the identification information in the RF communication module 10 of the RF communication unit B5.

In a preferred embodiment, the system for vehicle-to-vehicle identification and detection further includes an information processor 50 (refer to FIG. 1) that analyzes RF signals of the identification information received to calculate the distance between the present vehicle and the nearby vehicle.

As shown in FIG. 4, the RF communication unit E2 of the vehicle E also receives identification information from the RF communication module 10 of the RF communication unit A6 of the vehicle A once the RF communication unit E1 of the vehicle E receives identification information from the RF communication module 10 of the RF communication unit A5 of the vehicle A. Thereby the direction information in the identification information the RF communication module 10 of the RF communication unit A5 responds and in the identification information the RF communication module 10 of the RF communication unit A6 responds is processed and verified by the information processor 50 to find out the position of the vehicle A relative to the vehicle E (in the left front direction) and the distance between the vehicle A and the vehicle E.

Figure 5:
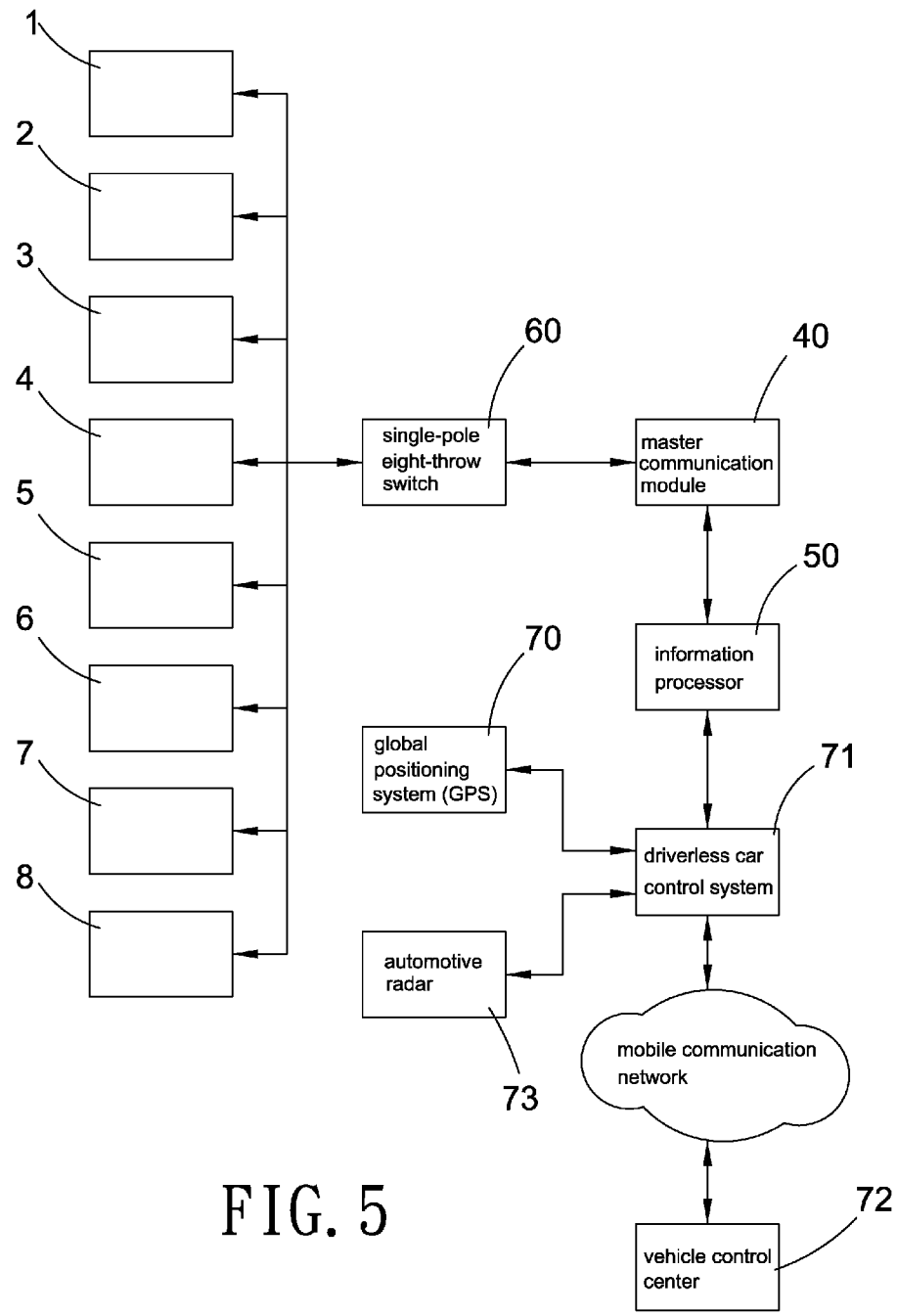
FIG. 5 is a block diagram showing system structure of an embodiment applied to a driverless car or an autonomous driving system according to the present invention.

Refer to FIG. 5, a structure of an embodiment applied to a driverless car or an autonomous driving system is revealed. A plurality of RF communication units 1-8 used for RF signal transmission in different communication directions is disposed on a vehicle body of a vehicle. The RF communication modules 10 of each RF communication unit 1-8 is used to respond communication requests from the nearby vehicles and transmit identification information of the present vehicle to the nearby vehicles. The present vehicle can also sends communication requests in different communication directions by the RF communication modules 10 of the RF communication units 1-8 using time-sharing polling or simultaneous communication scheme. Thus identification information of the nearby vehicles is obtained by the present vehicle through RF communication between the nearby vehicles and the present vehicle in different directions. The identification information obtained is further processed by the information processor 50 of the present vehicle to get various information including direction of the nearby vehicles, distance between the nearby vehicles and the present vehicle, and a combination thereof. In a preferred embodiment, an automotive radar 73 is used to get speed of the nearby vehicle (such as a car ahead) and a global positioning system (GPS) 70 of the vehicle is used to learn the position of the vehicle. Then these information is provided to a driverless car control system 71 arranged at the vehicle or transmitted to a vehicle control center 72 behind the scenes through a mobile communication network not only for providing mutual positions of the vehicles in the area accurately and precisely, but also for supporting vehicle active safety control and providing data required for the driverless car/autonomous driving.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A vehicle-to-vehicle identification and detection system comprising:
   a plural of radio frequency (RF) communication units each of which having a RF communication module and an antenna electrically connected to the RF communication module;
   a single-pole multiple-throw (SPMT) switch; and
   a master communication module;
   wherein the antennas of the RF communication units are in charge of RF communication between vehicles in different communication directions symmetrical to the center of the vehicle in the plane where the vehicle is located; the antennas of the RF communication units have different communication directions respectively while each of the RF communication unit is able to be switched between an active mode and a passive mode; the RF communication unit in the passive mode receives the communication requests from the nearby vehicles in the preset communication directions by the electrically-connected antenna; the RF communication unit sends a piece of identification information to the nearby vehicles by the electrically-connected antenna in response to the communication requests from the nearby vehicles after receiving the communication request; the master communication module switches the RF communication units to the active mode one after another by the SPMT switch using time-sharing polling or simultaneous communication scheme; the master communication module is electrically connected to the antenna of the RF communication unit in the active mode to send communication requests along the communication direction of the antenna and receive identification information the nearby vehicles transmit in response to the communication requests by the antenna.

2. The system as claimed in claim 1, wherein the system includes eight RF communication units; the antennas of the eight RF communication units are respectively in charge of RF communication between the vehicle and the nearby vehicles in eight communication directions symmetrical to the center of the vehicle in the plane the vehicles are located.

3. The system as claimed in claim 1, wherein the master communication module is a radio frequency identification (RFID) reader; the RF communication module includes a tag integrated circuit (IC) of a RFID tag and a single-pole double-throw (SPDT) switch; the identification information is stored in the tag IC; the tag IC is electrically connected to the antenna by the SPDT switch when the RF communication unit is in the passive mode; the master communication module is electrically connected to the antenna by the SPDT switch and electrical connection between the tag IC and the antenna is cut off when the RF communication unit is in the active mode.

4. The system as claimed in claim 1, wherein the identification information at least includes registration information of the vehicle, direction information of the communication direction of the communication request received by the vehicle, and operating parameters of the vehicle.

5. The system as claimed in claim 1, wherein the antennas are linearly polarized antennas; the linearly polarized antennas of the two adjacent RF communication unit are polarized in different directions including horizontally polarized and vertically polarized.

6. The system as claimed in claim 1, wherein the antennas are circularly polarized antennas; the circularly polarized antennas of the two adjacent RF communication unit are polarized in different directions including right-hand circularly polarized and right-hand circularly polarized.

7. The system as claimed in claim 1, wherein the antenna is a narrow-beam antenna.

8. The system as claimed in claim 1, wherein the system further includes an information processor arranged at the vehicle; the information processor analyzes RF signals of the identification information the nearby vehicles transmit in response to the communication requests of the vehicle so as to calculate the distance between the vehicle and the nearby vehicles.

9. The system as claimed in claim 8, wherein the information processor determines relative position of the nearby vehicle to the vehicle according to communication direction of one of the antennas in the identification information received or content of the identification information.

* * * * *